Nov. 24, 1953  H. M. JONES  2,660,490
RAILWAY CAR AXLE JOURNAL BEARING MOUNTING
Filed March 5, 1951  3 Sheets-Sheet 2

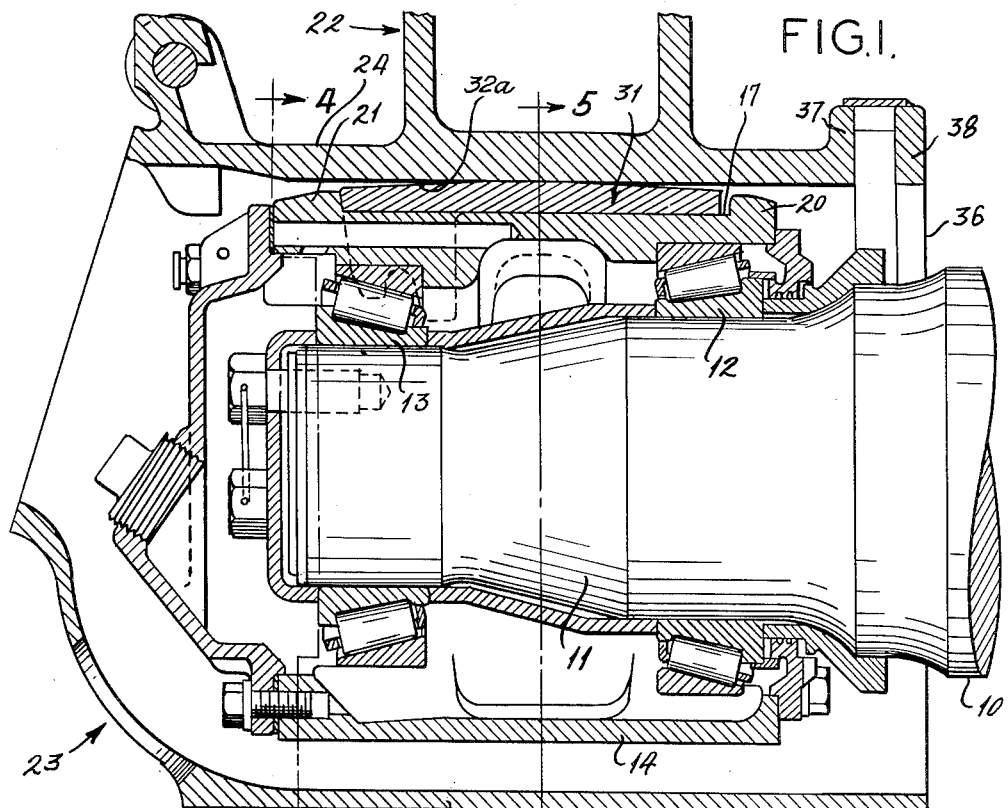
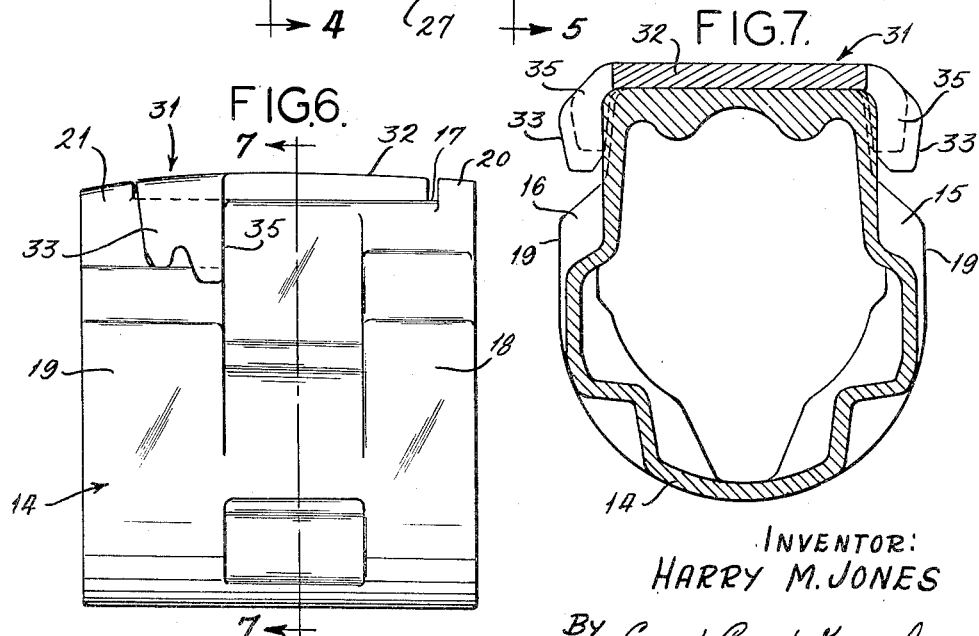

INVENTOR:
HARRY M. JONES
By Carr & Carr & Gravely
ATTORNEYS.

Nov. 24, 1953  H. M. JONES  2,660,490
RAILWAY CAR AXLE JOURNAL BEARING MOUNTING
Filed March 5, 1951  3 Sheets--Sheet 3
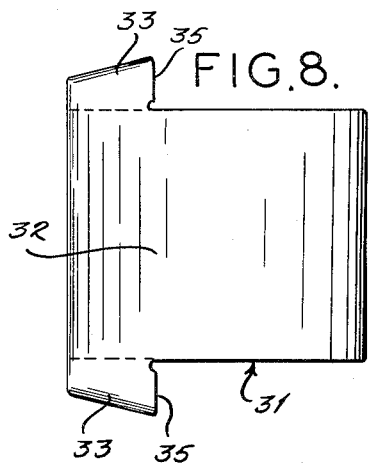
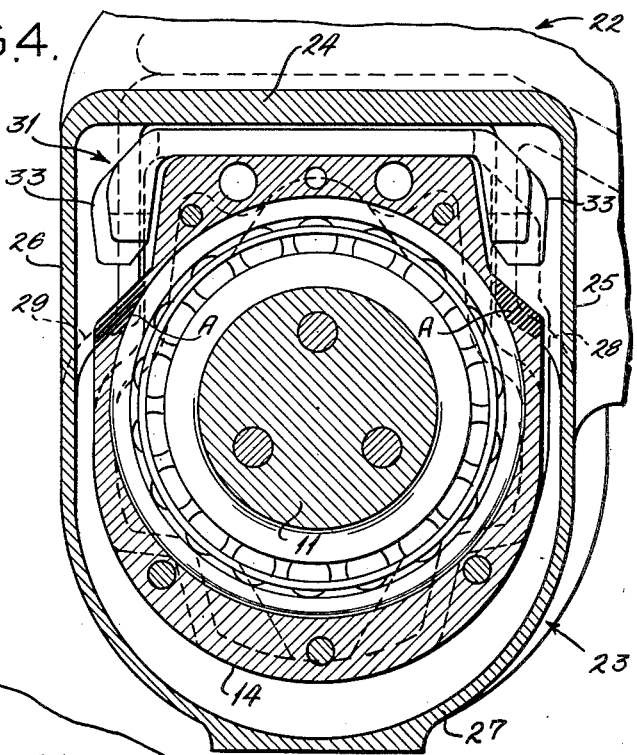
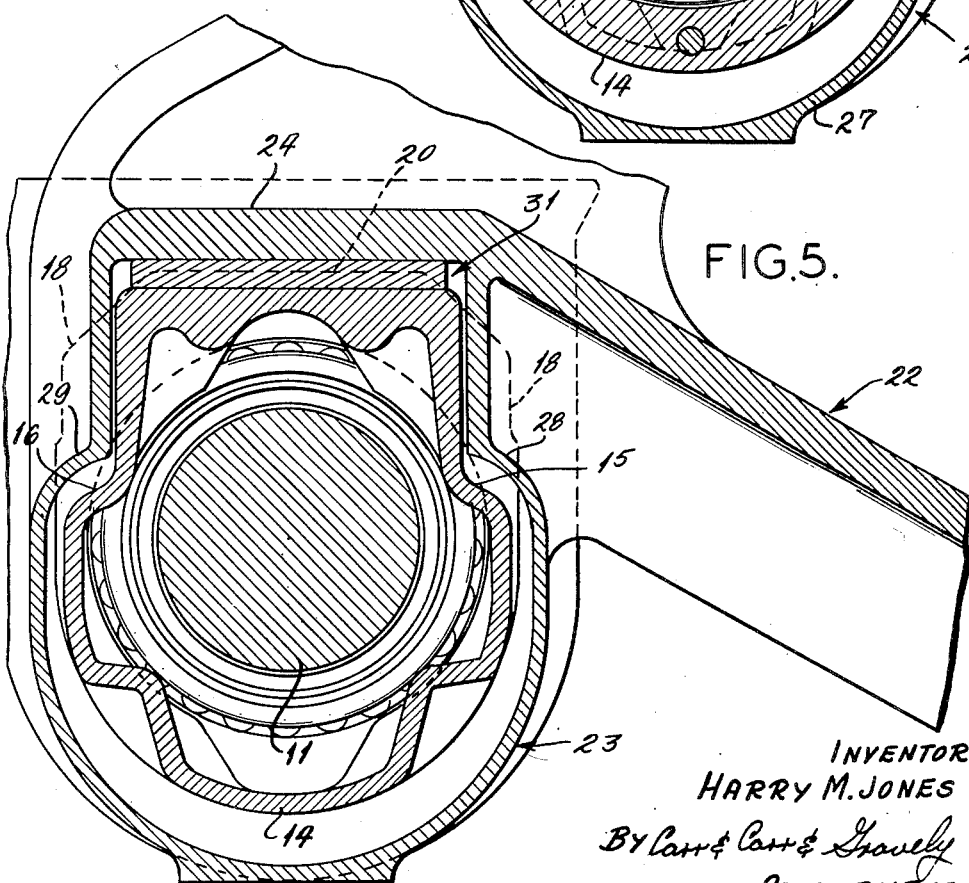
INVENTOR:
HARRY M. JONES
BY Carr & Carr & Gravely
ATTORNEYS.

Patented Nov. 24, 1953

2,660,490

UNITED STATES PATENT OFFICE 2,660,490

RAILWAY CAR AXLE JOURNAL BEARING MOUNTING

Harry M. Jones, Canton, Ohio, assignor to The Timken Roller Bearing Company, Canton, Ohio, a corporation of Ohio Application March 5, 1951, Serial No. 213,820

8 Claims. (Cl. 308—180)

This invention relates to railway car axle journal bearing mountings and is particularly concerned with improvements in the mounting of the axle journal bearings in the usual journal box of the car truck side frame structure.

An object of the present invention is to provide a journal bearing housing which is removably mounted in the journal box in such a manner that there is no sacrifice in the capacity of the housing to receive or transfer thrust loads while in service.

It is also an object of the present invention to provide a bearing housing with a wedge member which cooperates therewith to increase the area of the thrust surfaces available for engagement with the side frame journal box thrust surface.

Still another object of the present invention is to provide a combined bearing and thrust member associated with the bearing housing as a removable and replaceable part of the bearing mounting assembly.

It is also an object to provide a separate or removable wedge type bearing member between a railway car axle journal housing and the side frame journal box so that bearing loads therebetween are taken by the removable member with the advantage that service wear may be corrected simply by replacement of the relatively inexpensive wedge member.

Still a further object hereof is to provide an axle journal bearing housing with a separate thrust and load carrying member for engagement with the usual side frame journal box, whereby the separate bearing member may be formed from suitable wear resistant material and the journal bearing housing may be formed of a different material which is more suitable and adaptable to the economical formation of such housing.

The invention consists in the provision of a bearing housing to receive spaced tapered roller bearings for the axle journal and formed with exterior recesses which receive complementary projections in a journal box for the housing whereby thrust loads are taken therebetween, and a combined bearing and thrust member of the replaceable wedge type in a further housing recess which materially increases thrust load surfaces and by which bearing loads are also taken.

Further, the invention consists in the parts, and combination and arrangement of parts hereinafter particularly described and claimed in connection with the accompanying drawings in which:

Fig. 1 is a longitudinal sectional elevational view of the car axle journal bearing housing and side frame journal box assembly showing the wedge thrust member therein.

Fig. 4 is a transverse sectional detail at line 4—4 of Fig. 1.

Fig. 5 is a view similar to that of Fig. 4, but showing transverse sectional details of the assembly at line 5—5 in Fig. 1.

Fig. 6 is a side elevational view of the axial journal bearing housing and separate thrust member as the same appear when removed from the journal box.

Fig. 7 is a transverse sectional view along the line 7—7 of Fig. 6 and

Fig. 8 is a top plan view of the wedge type thrust member herein preferred.

Figure 2:
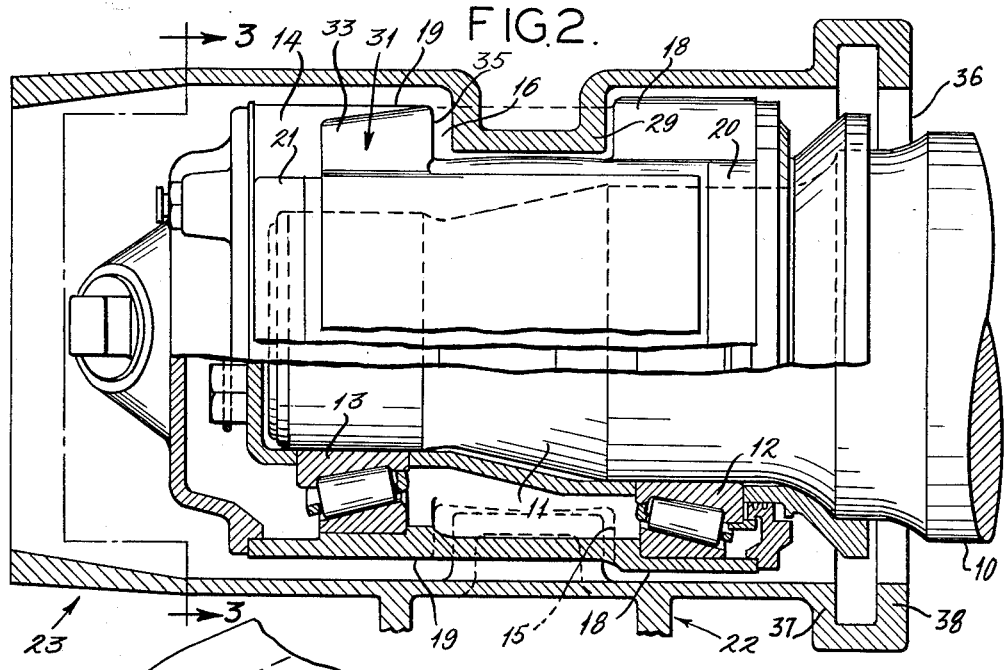
Fig. 2 is a top plan view, partly in section, as taken at line 2—2 of Fig. 3.
Figure 3:
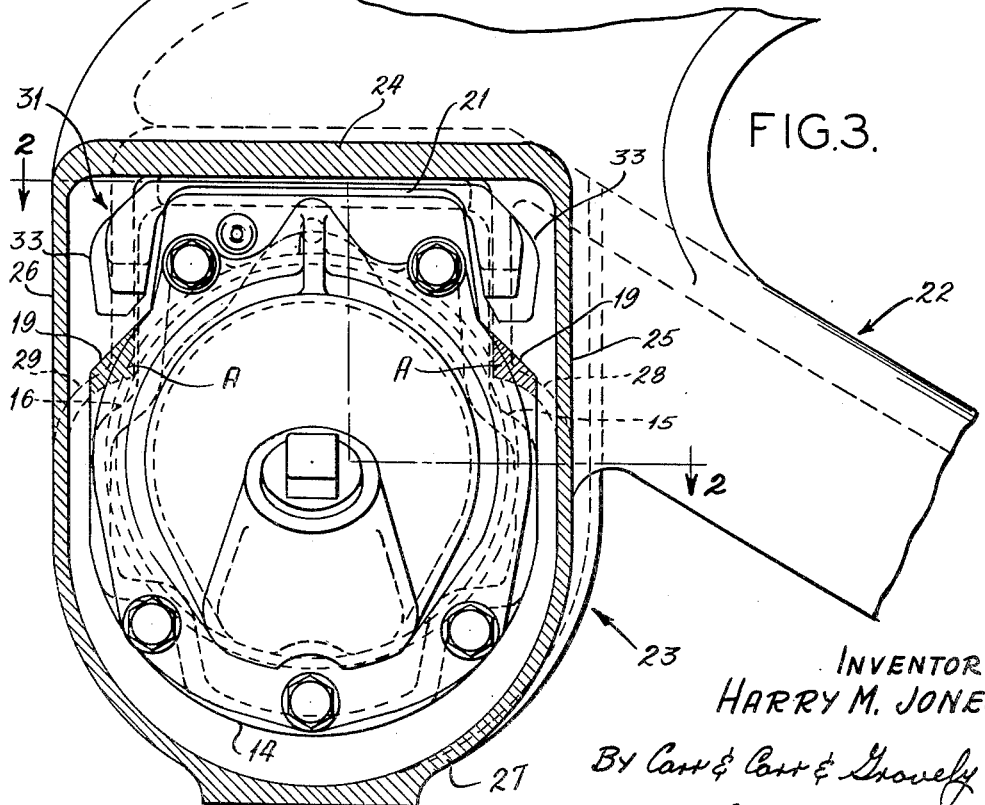
Fig. 3 is an end elevational view of the bearing housing and wedge member, with the journal box in section, at line 3—3 in Fig. 2.

Reference now will be made to Figs. 1, 2, and 3 for details of the present assembly. The railway car axle 10 is provided with a stepped journal portion 11 which is mounted in suitable antifriction or roller bearing members 12 and 13, and these bearings are in turn suitably secured in a bearing housing 14. The bearing housing 14 is generally symmetrically formed on each side of a vertical plane through its longitudinal axes, and is provided at its exterior with a plurality of recesses such as 15, 16, and 17. The recesses 15 and 16 are located intermediate the ends and on opposite vertical sides of the housing 14, and are partly defined by projections or lugs 18 and 19 which provide outstanding thrust margins for the recesses. The recess 17, by preference, is formed at the upper side of the bearing housing 14 and is defined by flange extensions 20 and 21 whereby the recess 17 is given a channel like form.

Still with reference to Figs. 1, 2 and 3, it will be observed that the railway car truck side frame is indicated by a fragmentary portion at 22 thereof. This side frame is provided with a journal box generally indicated at 23. The journal box is formed with a relatively flat upper wall 24, depending side walls 25 and 26 and a rounded bottom wall 27 forming a smooth continuation of the side walls. Each of the side walls 25 and 26 of the journal box are provided with interior or inwardly projecting portions 28 and 29 respectively and the interior of this journal box below the projections 28 and 29 is relatively free of any internal obstructions, so that the axle journal bearing housing may be freely inserted or removed from the journal box 23 when the bearing housing is first located adjacent the lower wall 27 thereof.

It will be noted in connection with Figs. 2 through 5, that the internal projections 28 and 29 formed in the journal box 23 are adapted to be received in the side recesses 15 and 16 formed in the bearing housing member when the journal box and bearing housing are in final assembly position. This inter-fitting relationship between the recesses of the housing and the internal projections of the journal box establish an interlocked relationship therebetween. Heretofore, side load or thrust in the axial direction of the axle journal was taken almost entirely at the overlapping surfaces of the recesses 15 and 16 and projections 28 and 29. It will be appreciated in connection with Figs. 3 and 5 that the shaded area A of overlapping between the projections 28 and 29 and recesses 15 and 16 respectively is relatively small in relation to the magnitude of the loads to be taken thereby.

An important object of the present invention is directed to the provision of the wedge member 31, shown in Figs. 6, 7 and 8. This wedge 31 is adapted to provide an increase in the thrust area between the journal bearing housing and the side frame journal box without necessitating structural changes in the journal box and a relatively inexpensive alteration of the bearing housing where the thrust member or wedge 31 may be applied to an existing assembly. The member 31 is provided with a body portion 32 which is adapted to be received in the channel-like recess 17 in the top surface of the bearing housing 14. The body portion 32, as may be observed in Figs. 1 and 6, is formed with an arcuate or crowned upper surface 32a which constitutes the bearing or load carrying surface between the bearing housing 14 and the journal box 23. The crowned formation of the surface 32a is provided in order to allow for angular alignment of the bearing housing and the journal box in service. It is also readily observed that the service wear is taken directly by the wedge member in the body portion 32, and that this member may be replaced when it has reached a critical condition, thereby eliminating the expense of replacing either the bearing housing 14 or the side frame journal box 23 or both.

An additional important feature obtained by the provision of the wedge member 31 may be clearly understood by reference to Figs. 4, 6 and 7. It will be observed that the wedge member 31 is provided with elements or lugs 33 at its longitudinal margins and that these lugs extend downwardly at opposite sides of the bearing housing. These lugs are arranged so that surfaces 35 thereof lie in a common vertical plane with the thrust receiving surfaces of the projections 19 on the bearing housing 14 which is adapted to be contacted by the internal projections in the journal box. Thus, the depending lugs 33 on the wedge member 31 take or transfer thrust loads at least simultaneously with but preferably before the areas A (Figs. 3 and 4), these areas A designating the load area of the side faces of the bearing housing recesses 15 and 16. Accordingly the depending side lugs of the wedge member 31 very greatly increase the total thrust area between the bearing housing and the journal box, and that portion of the thrust load taken by the wedge member 31 is transferred to or through the greatly enlarged area of the upstanding flange 21 of the bearing housing 14.

It will now be observed that there has been provided a thrust and bearing member 31 which is very easily and economically formed of a suitable wear resistant material. The member is formed as a separate part which may be easily assembled in a railway journal bearing mounting assembly to improve the wearing qualities thereof and to increase the possible thrust loads in the assembly. The provision of a separate wedge member, such as the member 31, allows for the manufacture of the bearing housing parts of a material which is particularly suitable to an economical process of forming the same. There is no necessity for comprising suitability of material therefor with the requirements of a material for resisting wear in service. In other words, the bearing housing 14 may be formed of a material suitable for its economical production and the wedge member 31 may be formed of a different material best suited for its wear resistant characteristics. Experience has shown that the crowned bearing surface does flatten in service, and if an integral part of the housing 14 would require replacement of the entire housing when the flattened surface reached a width equal to the diameter of the axle journal. A replaceable wedge member, as member 31, eliminates the expense of the replacement of housing 14.

The present improvements relate to railway car axle journal bearing mountings which may be applied to standard A. A. R. axle and journal box assemblies without material alteration thereof, as has been fully described in a prior Patent 2,438,214, issued in the name of Ralph E. Horger on March 23, 1948. In that patent it was pointed out that the journal box was modified by removing the usual dust guard walls at the innermost end, to provide sufficient room for reception of the bearing housing. In the present assembly, the journal box 23 has been modified at its innermost end 36 so that a clear entrance for the housing 14 is obtained. A portion of the dust guard walls may be seen at 37 and 38 in Figs. 1 and 2, the inwardly projecting portions thereof having been removed by suitable machining operations.

Having now pointed out a preferred embodiment of the present invention, it should be understood that certain changes and modifications may be made therein without departing from the scope and spirit of the appended claims.

What I claim is:

1. A car axle journal roller bearing mounting comprising a housing for roller bearings provided with opposite side recesses each having an outstanding thrust margin, said housing also providing a top recess defined between inner and outer end flanges on the housing, a thrust member seated in said top recess against one of said flanges, said member having lugs thereon with thrust faces adjacent said side recesses, and a journal box enclosing said housing and member, said box being formed with internal projections which extend into said side recesses and are engaged by said housing thrust margins and by the thrust faces of said lugs.

2. A car axle journal roller bearing mounting as set forth in claim 1, wherein said roller bearing housing is symmetrically formed about a vertical plane through the longitudinal axis thereof, and said side recesses are located substantially centrally of the ends of said housing.

3. A car axle journal roller bearing mounting as set forth in claim 1, wherein the thrust margins of said side recesses in said housing and the thrust faces of said thrust member lugs are located substantially in a common plane.

4. A car axle journal roller bearing mounting as set forth in claim 1, wherein said thrust member forms the principal bearing surface between said housing and journal box.

5. A car axle journal roller bearing mounting as set forth in claim 1, wherein said thrust member is formed with a crowned surface for bearing support of the journal box, and said member is removably seated in said top recess of the roller bearing housing.

6. A car axle journal roller bearing mounting assembly comprising a side frame journal box formed with internal projections intermediate the inboard and outboard ends thereof and located in opposite sides thereof, a housing adapted to receive roller bearings and form a mounting therefor in said journal box, said housing being formed with a recess in each of its opposite sides to receive the internal projections on said journal box and interconnect said housing and box for thrust reactions therebetween and further providing innermost and outermost thrust flanges defining a recess distinct from said side recesses and a combined bearing and thrust member between said housing and journal box, said member having lugs thereon in thrust transmitting abutment with the internal projections of said journal box and said member engaging one of said thrust flanges on said housing.

7. A railway car axle journal bearing mounting comprising an axle having a journal portion, spaced roller bearings on said journal portion, a cartridge type housing receiving the roller bearings and enclosing said axle journal portion and said spaced roller bearings, said housing having a top wall formed with a channel recess defined between inner and outer shoulders and thrust recesses in its opposite sides, a journal box having internal projections in its side walls to be received in said housing thrust recesses upon relative vertical movement of said journal box and housing, and a bearing wedge in said housing channel recess supporting said journal box on said housing top wall said wedge having thrust engagement with one of said channel recess shoulders and having depending thrust lugs at each side in thrust engagement with the internal projections of said journal box.

8. The railway car axle journal bearing mounting set forth in claim 7, wherein said depending thrust lugs on said wedge have thrust faces located in a plane containing the thrust faces of said housing side recesses, said thrust faces jointly transmitting thrust loads between said wedge and housing and said journal box.

HARRY M. JONES.

References Cited in the file of this patent

UNITED STATES PATENTS

| Number | Name | Date |
|---|---|---|
| 1,460,802 | Nystrom | July 3, 1923 |
| 2,274,218 | Scribner | Feb. 24, 1942 |
| 2,438,214 | Horger | Mar. 23, 1948 |
| 2,597,516 | Noe | May 20, 1952 |